Patented Sept. 29, 1953

2,653,876

UNITED STATES PATENT OFFICE 2,653,876

STABILIZED CREAMED FOOD PRODUCTS

Helen L. Hanson and Hans Lineweaver, Berkeley, Calif., assignors to the United States of America as represented by the Secretary of Agriculture No Drawing. Application August 12, 1952,
Serial No. 304,053

7 Claims. (Cl. 99—182)

(Granted under Title 35, U. S. Code (1952), sec. 266)

A non-exclusive, irrevocable, royalty-free license in the invention herein described, for all governmental purposes, throughout the world, with the power to grant sublicenses for such purposes is granted to the Government of the United States of America.

This application is a continuation-in-part of our copending application Ser. No. 191,914, filed Oct. 24, 1950, now abandoned.

This invention relates to the preparation of edible compositions of matter of the type which are commonly thickened by the use of starches, flours, or other amylaceous materials, such compositions being, for example, sauces, gravies, creamed meat dishes, cream soups, puddings, custards, pie fillings, salad dressings, and so forth. In particular, this invention concerns the use of waxy rice flour or waxy rice starch in such compositions as the thickening agent whereby the resulting composition is stabilized in that it will retain its smooth, creamy texture and will exhibit little if any separation of liquid. The compositions in accordance with this invention containing waxy rice exhibit this stability even after being subjected to preservation procedures and storage prior to ultimate use. Thus the compositions retain their smooth, creamy texture and exhibit little if any separation of liquid even after being frozen and thawed or even after being subjected to canning and storage for extended periods of time. Consequently our products are not subject to quality deterioration by the effect of freezing and thawing or by the effect of canning and storage as are the products heretofore known.

Although our invention is especially adapted to the preparation of sauces and gravies, it is also applicable to all types of food products which consist entirely or in part of a thickened liquid mass, such products including creamed meat dishes, creamed vegetable dishes, creamed meat and vegetable dishes, puddings, custards, salad dressings, pie fillings, creamed soups, and so forth.

The problems with which this invention is concerned may be explained as follows, particular reference being made to pre-cooked, frozen creamed chicken merely by way of example.

The preparation of pre-cooked, frozen creamed chicken usually involves the following technique: The chicken is first cooked in water and the meat then separated from the bones and minced into suitable small pieces. A white sauce containing fat, milk, wheat flour or corn starch, and salt is then prepared and mixed with the minced meat. This composition is then packaged, frozen, and maintained in frozen storage until ready to be used. When such a product is thawed for use, two undesirable changes will be noted. In the first place the thawed material will show phase separation, that is, the emulsion will be broken and a watery liquid will exude out of the mass. In the second place, the mass will no longer be smooth and creamy but exhibits a lumpy texture, in extreme cases resembling the appearance of curdled milk or cottage cheese. These changes are of course adverse to the wide utilization of pre-cooked frozen foods of this type primarily because the non-technical consumer is led to believe that the product is spoiled or of low quality. These deleterious changes are due to the type of starchy material used, as hereinafter explained, and will occur with all of the starchy materials generally used for such purposes, for example wheat flour or starch, corn starch, rice flour or starch and so on. As a matter of fact the undesirable changes which occur on thawing are not entirely irreversible as the composition may be stirred vigorously while heating thus to form a product which approximates the original creamy emulsion. However, in practice such vigorous stirring cannot be used because it would tend to mash the solid components of the product such as the minced meat, or vegetables if such are present. This problem of the deleterious changes in creamed products upon thawing has been known in the industry for many years but heretofore no one has succeeded in alleviating the situation.

The problems outlined above in connection with frozen, creamed chicken are also involved in preparing canned creamed products. Thus for example when a creamed soup is made in the customary manner by thickening soup ingredients with corn starch or wheat flour and the product canned, that is, placed into hermetically sealed containers and subjected to heat to sterilize the product so that it will keep indefinitely, it will be observed that the product does not retain its creamy texture. As the canned product is stored, its viscosity increases and it becomes more of a gel rather than merely a thickened liquid. With further storage, the product becomes a rubbery gel which eventually shrinks, exuding watery liquid about the gel matrix. In some cases, the product may also become lumpy and exhibit a curdled appearance. In any case all of these changes—increase in viscosity, gelling, exudation of watery liquid, and curdling— are deleterious in that when the can is opened by the consumer the product does not present an attractive appearance and is difficult to remove from the can. Reconstitution of the product to re-form its creamy texture requires application of heat and vigorous stirring, the latter being undesirable as it tends to mash solid components of the product such as minced meat, vegetables, etc. As set forth above in connection with the frozen products, the deleterious changes which occur on storage after canning are due to the starchy material used as the thickening agents.

We have now found that the problems briefly explained above can be remedied in a very simple and expeditious manner. In essence, our new departure primarily involves using waxy or glutinous rice (*Oryza glutinosa*) as the thickening agent in preparation of the sauce, gravy or other creamed product. Thus the food product is prepared in the usual and customary manner except that waxy rice flour is used instead of the wheat flour or starch or other commonly used thickening ingredient. In many cases, the waxy rice flour need not be used as the sole thickening agent but can be used to replace part of the ordinary thickening agent. The food products prepared in accordance with this invention, when frozen and thawed or when canned and stored, do not undergo any deleterious changes. The sauce remains smooth and creamy and the product shows very little, if any, exudation of liquid. Thus by the application of this invention it is possible for the first time to prepare a pre-cooked, creamed frozen product which when thawed presents an appetizing appearance like the freshly prepared product. It is also possible for the first time to prepare a canned creamed product which even after storage presents an appetizing appearance like the freshly prepared product. Further, the products produced in accordance with this invention have the desirable property of being "short" pastes and do not have the gummy or "long" character of pastes obtained with tapioca or waxy maize starch.

It is to be emphasized that in proceeding in accordance with this invention we use a particular type of starchy material, i. e., that derived from waxy rice. This material is to be contrasted with normal rice flour or starch. The differences between the normal and waxy starches can be explained as follows. The starch from the normal cereals such as corn, wheat, rice, potato, tapioca, etc. contains 15 to 30% of amylose and 70–85% amylopectin. These fractions, amylose and amylopectin, have entirely distinct structure and properties. Thus amylose is of linear structure and is soluble in hot water, the solution showing an exaggerated tendency to retrograde or revert to the insoluble state on cooling. It is the amylose fraction of the normal starches which makes them useful for production of gels by virtue of this retrogradation property. Further, amylose yields a blue coloration upon contact with iodine. On the other hand, amylopectin has a branched structure and is soluble in water at concentrations of 5–10%, such solutions being relatively stable in a physical sense. Further, amylopectin yields a red or violet coloration upon contact with iodine. In contrast to the normal cereals, there are waxy or glutinous strains of some cereals, namely, maize, sorghum, rice, rye, and barley. No waxy strains of wheat or the root or tuber starches have been found. The starches from these waxy or glutinous cereals are virtually pure amylopectin. The composition of some typical starches is set forth in the following table:

*Composition of starches from various sources*

| Starch | Amylose, percent | Amylopectin, percent |
|---|---|---|
| Normal cereals: | | |
| Corn | 21–24 | 76–79 |
| Wheat | 15–30 | 70–85 |
| Rice | 15–30 | 70–85 |
| Potato | 21–24 | 76–79 |
| Tapioca | 17–21 | 79–83 |
| Sago | 27 | 73 |
| Lily bulb | 34 | 66 |
| Waxy or glutinous cereals: | | |
| Maize | 0 | 100 |
| Rice | 0 | 100 |
| Sorghum | 0 | 100 |
| Rye | 0 | 100 |
| Barley | 0 | 100 |

It is to be emphasized that difference in proportions of amylose and amylopectin is not the sole basis for the differences between various starches. The point is that the amylose and amylopectin fractions of each starch differ from one another in such attributes as length of molecular chains, degree of branching, molecular weight, and so forth. Thus for example, wheat starch and tapioca starch have virtually the same amylose-amylopectin proportion yet each of these starches will produce a different type of paste. Wheat starch paste has what is known in the industry as a "short" texture whereas tapioca produces a paste of glutinous or "long" texture.

We have found that the starch of waxy rice is outstanding among starches for the purposes of this invention. In the first place, the paste or creamed product produced with the waxy rice is stable to freezing and thawing and stable when canned and stored. In this respect it is far superior to normal starches and even superior to waxy maize starch which because of its high amylopectin content would be expected to yield a paste stable to freezing and thawing and canning and storage. Another important point is that waxy rice flour yields a "short" paste which is essential in the production of sauces and gravies and usually preferred in the case of puddings and similar desserts. Thus the paste with waxy rice flour is similar to that prepared with wheat flour or normal corn starch. In contrast, waxy maize starch yields a glutinous or long paste which because of its cohesive and gummy nature is totally unsuited for the preparation of sauces and gravies. The waxy maize paste is quite similar to that produced with tapioca and as a matter of fact waxy maize starch came into wide use during the recent war as a substitute for tapioca when supplies of the latter were cut off by the exigencies of warfare.

The application of the principles of this invention to the preparation of any desired type of foodstuff presents no problems. It is merely necessary to substitute the waxy rice for the conventional flour or starch in the cooking recipe. In some cases the waxy rice will have to be used in somewhat greater proportion than the starch or flour it is replacing in order to get the same viscosity. The proper amount of waxy rice to use in any particular instance can easily be determined by the use of a standard calibrated flow table or other device suitable for measuring the viscosity of a sauce or gravy. Another point to be noted is that the stabilizing power of waxy rice is so great that it need not be used as the sole thickening agent but may be mixed with the normal (high amylose) starch in the proportion of, say, 20 to 80% waxy rice, the remainder being the normal starch or flour. As in the preparation of known creamed food products, the essential step in preparing our novel products is to disperse the waxy rice in the water or other aqueous edible medium, as for example, milk, broth, fruit juice, and so forth. Such dispersing entails stirring the waxy rice into the liquid and cooking for a short period to ensure complete dispersion. The concentration of waxy rice depends on the thickness of the product desired, usually a concentration from about 2% to about 10% is desirable. The resulting thickened liquid is then admixed with the desired flavoring agents or other food items such as meat, eggs, vegetables, or fruit and sugar, depending on the type of product desired. Colloidal materials such as gelatin, gum tragacanth, Irish moss extract, etc. may be added to obtain thicker or more gel-like products. Where the food product is to contain a fat it is usually advantageous to first blend the fat and the waxy rice and then add the liquid and cook the mixture with stirring for a few minutes. After addition of the desired flavoring ingredients or additional nutrient matter the mass is packaged in suitable containers such as cartons or cans, frozen, and maintained in frozen storage. If it is desired to prepare a canned product then the mass is placed into containers, such as cans or glass jars, which are sealed then subjected to heat, the temperature and time of heating being regulated to assure sterilization of the product so that it will keep indefinitely. The most economical way of employing the waxy rice is as the flour which is made by grinding the separated endosperm of the waxy rice. If desired one can use the waxy rice starch prepared by subjecting the flour to a separation treatment to remove its protein content.

In applying this invention to the preparation of pre-cooked, frozen, creamed turkey or chicken, we find it advantageous to initially cook the fowl in the presence of an antioxidant thus to retard oxidation of the turkey or chicken fat during the cooking process. Details regarding the use of this technique are described and claimed in the patent application of H. Lineweaver, H. L. Hanson, and A. A. Klose, entitled Stabilized Meat Products, Serial No. 188,861, filed October 6, 1950.

The following examples demonstate our invention in greater detail. It is understood that these examples are furnished only by way of illustration and not limitation.

EXAMPLE I

A series of white sauces were prepared and tested as follows:

In each case the white sauce was prepared by first melting the shortening and blending it with the flour or starch. The milk was separately heated to 60° C. then added to the shortening-thickening agent and blended all at once with stirring. This mixture was boiled for one minute and the salt added during the last 20 seconds of the boil. The products were then packaged in cans, frozen, and maintained in frozen storage at 0° F. for two months. After this period of time the samples were tested for quality in the following manner:

Two cans of each lot were subjected to thawing while the product was still in the can. The contents were then removed and subjected to centrifugation and filtration to separate the watery liquid, if any, from the sauce, the amount of liquid exudate being measured.

Two cans of each lot were subjected to thawing while the product was still in the can. The contents of each can were then poured into a petri dish and the appearance of the various samples determined by a panel of persons skilled in the art of judging quality of foods. For controls, samples of white sauce were prepared just prior to the quality determination. These control samples were of course not subjected to any freezing treatment.

The recipes of the various samples of white sauce are listed below. Samples A and B were prepared in accordance with this invention, the other samples being prepared with various flours and starches now commonly used in the preparation of creamed foodstuffs, these samples being included for the sake of comparison with applicants' products.

|   |   | Grams |
|---|---|---|
| A. | Waxy rice flour | 35 |
|   | Hydrogenated vegetable shortening | 25 |
|   | Milk | 488 |
|   | Salt | 3 |
| B. | Waxy rice flour | 17.5 |
|   | Wheat flour | 12.5 |
|   | Shortening, milk, and salt as in A | |
| C. | Wheat flour | 25 |
|   | Shortening, milk, and salt as in A | |
| D. | Waxy maize starch | 23 |
|   | Shortening, milk, and salt as in A | |

It is to be noted that the amount of thickening agent is different in each sample. This was done in order to produce truly comparative sauces. Thus using the proportions stated, each sauce had the same viscosity, i. e., a line spread of approximately 24 as measured on a standard calibrated flow table.

The results of the tests are set forth in the following tables:

TABLE 1

Liquid separation from products after thawing

| Sample | Thickening agent used | Amount of liquid which separated on thawing, percent [1] |
|---|---|---|
| A | Waxy rice flour | 0 |
| B | Waxy rice flour and wheat flour | 6 |
| C | Wheat flour | 41 |
| D | Waxy maize starch | 23 |

[1] The figures in this table are averages of duplicate lots of each sample of white sauce.

TABLE 2

Appearance of products on thawing

| Sample | Thickening agent used | Score for appearance [1] |
|---|---|---|
| A | waxy rice flour | 9.3 |
| B | waxy rice flour and wheat flour | 6.0 |
| C | wheat flour | 4.6 |
| D | waxy maize starch | 2.2 |
| Control 1 [2] | waxy rice flour | 10.0 |
| Control 2 [3] | wheat flour | 8.6 |

[1] The figures in this table are averages of duplicate lots of each sample of white sauce. The products were judged on a basis of 10 for smooth and creamy texture and 1 for very watery or curdled.
[2] Control 1 was a freshly-prepared sample of white sauce prepared in accordance with recipe A and not subjected to freezing.
[3] Control 2 was a freshly-prepared sample of white sauce prepared in accordance with recipe C and not subjected to freezing.

EXAMPLE II

A series of chicken gravies were prepared and tested as follows:

In each case the gravy was prepared by first melting the chicken fat and blending it with the flour or starch. The broth, drippings, and water were then stirred into the blend and the mixture boiled with stirring for a few minutes to get a smooth gravy. The salt was added during the last period of the boiling operation. The products were packaged in cans, frozen and allowed to stand at 0° F. for one month. After this period of time, the products were tested for liquid separation and appearance by the methods set forth in Example I. The recipes for the various samples of gravy are listed below. Sample A was prepared in accordance with this invention, the other samples being prepared with commonly used thickening agents, these samples being included for the sake of comparison with applicants' products:

|   |   | Grams |
|---|---|---|
| A. | Waxy rice flour | 70 |
|    | Chicken fat | 50 |
|    | Chicken broth and drippings | 405 |
|    | Water | 571 |
|    | Salt | 6 |
| B. | Waxy maize starch | 44 |
|    | Chicken fat | 50 |
|    | Chicken broth and drippings | 405 |
|    | Water | 771 |
|    | Salt | 6 |

(More water was required in this case to make the gravy of the same thickness as gravies A and C.)

| C. | Wheat flour | 50 |
|---|---|---|
|    | Chicken fat | 50 |
|    | Chicken broth and drippings | 405 |
|    | Water | 571 |
|    | Salt | 6 |

The results of the tests are shown in the following tables:

TABLE 3

*Liquid separation of products after thawing*

| Sample | Thickening agent | Amount of liquid which separated on thawing, percent |
|---|---|---|
| A | waxy rice flour | 0 |
| B | waxy maize starch | 33.8 |
| C | wheat flour | 57.5 |

TABLE 4

*Appearance of products on thawing*

| Sample | Thickening Agent | Score for appearance [1] |
|---|---|---|
| A | waxy rice flour | 9.7 |
| B | waxy maize starch | 4.5 |
| C | wheat flour | 2.2 |

[1] The products were scored on a basis of 10 for smooth and creamy texture and 1 for very watery or curdled.

EXAMPLE III

Puddings were prepared employing the following ingredients:

|   | A | B |
|---|---|---|
| Amylaceous material, percent | cornstarch, 2.9 | waxy rice flour, 3.9 |
| gelatin, percent | 0.4 | 0.45 |
| milk, percent | 83.9 | 82.9 |
| sugar, percent | 10.4 | 10.3 |
| salt, percent | 0.15 | 0.15 |
| water, percent | 1.5 | 1.5 |
| vanilla, percent | 0.7 | 0.7 |

In preparing product B, the proportions of amylaceous material and gelatin were somewhat above the proportions of these ingredients in product A so that both A and B would have the same initial consistency. In each case, the amylaceous material, sugar, and salt were stirred until smooth with part of the milk (cold). The remaining milk was scalded, the above mixture was added, and the material was cooked 15 minutes while stirring constantly until it thickened. The gelatin moistened with the water was then stirred in and finally the vanilla was incorporated with stirring. The pudding mix was then cooled, packaged, and frozen at 0° F. After storing at 0° F. for 1 day and for 9 months, respectively, samples of the frozen pudding were allowed to thaw and examined. The results obtained are tabulated below:

| Product | Texture after thawing | |
|---|---|---|
|  | Stored 1 day at 0° F. | Stored 9 mo. at 0° F. |
| A (corn starch) | curdled, some liquid separation. | curdled, much liquid separation. |
| B (waxy rice) | smooth, no liquid separation. | smooth, no liquid separation. |

EXAMPLE IV

Custard-type desserts were prepared employing the following ingredients:

|   | A | B |
|---|---|---|
| amylaceous material, percent | cornstarch, 3.0 | waxy rice flour, 3.0 |
| egg yokes, percent | 6.0 | 6.0 |
| milk, percent | 79.0 | 79.0 |
| sugar, percent | 10.3 | 10.3 |
| salt, percent | 0.15 | 0.15 |
| vanilla, percent | 0.7 | 0.7 |

In each case, a small amount of the milk (cold) was mixed with the egg yolks and a small amount of the milk (cold) was mixed with the dry ingredients. The remaining milk was heated to 70° C. and to it was added the mixture of cold milk, amylaceous material, sugar, and salt; the material was heated in a double boiler (85–95° C.) with constant stirring for 10 minutes. This hot mixture was then added with stirring to the yolk-milk mixture and the material heated in a double boiler (85–90° C.) with stirring for 10 minutes. The vanilla was then added and the custard mix was packaged, cooled, and frozen at 0° F. After storing at 0° F. for 1 day and for 2 months, respectively, samples of the frozen custard were allowed to thaw and examined. The results obtained are tabulated below:

| Product | Texture after thawing | |
|---|---|---|
|  | Stored one day at 0° F. | Stored 2 mo. at 0° F. |
| A (corn starch) | curdled, liquid separation. | curdled, liquid separation. |
| B (waxy rice) | smooth, no liquid separation. | smooth, no liquid separation. |

EXAMPLE V

A series of products were prepared employing the following ingredients:

|   | Percent |
|---|---|
| Amylaceous material (as specified below) | 5 |
| Salt | 1 |
| Water | 94 |

In each case the amylaceous material (wheat flour, waxy rice flour, corn starch, and waxy maize starch, respectively) and salt were stirred with cold water to get a uniform dispersion and the dispersion then heated with constant stirring until it thickened. The thick material, of the consistency of a sauce or gravy, was filled into cans which were then sealed and autoclaved at 240° F. for 60 minutes to ensure sterilization. Samples of the products as immediately prepared and after storage in the cans for 30 days at 25° C. were subjected to viscosity tests and measurements of their modulus of elasticity. Also after storage at 25° C. in the cans, the products were examined as to texture. The results are summarized below:

|  | Expt. 1 | Expt. 2 | Expt. 3 | Expt. 4 |
|---|---|---|---|---|
| Amylaceous material | wheat flour | waxy rice flour | cornstarch | waxy maize starch. |
| Initial viscosity, poises at 25° C | 2.3 | 6.9 | 2.1 | 1.6. |
| Viscosity after storage, 30 days at 25° C., poises at 25° C. | 7.5 | 6.9 | 14.0 | 0.7. |
| Initial modulus of elasticity, g./sq. cm. | 0.051 | 0.03 | 0.046 | 0.002. |
| Modulus of elasticity after storage for 30 days at 25° C., g./sq. cm. | 0.114 | 0.03 | 0.14 | (1). |
| Appearance after storage for 30 days at 25° C. | Too stiff to pour from can, showed liquid separation. | Smooth, no liquid separation, could be poured from can. | Too stiff to pour from can, showed liquid separation. | Entire contents of can thin and watery. |

[1] Too low to be measurable.

It is evident from the above data, that the product made with waxy rice (Expt. 2) retained its viscosity and modulus of elasticity (a measure of the amount of gelation) constant for 30 days storage after canning. On the other hand the products made with wheat flour and corn starch (Expts. 1 and 3) increased in viscosity and degree of gelation. The product made with waxy maize starch (Expt. 4) became thin and watery thus entirely losing its original sauce-like nature.

In this series of experiments, no flavoring other than salt was used to avoid any extraneous effects on the experiments. It is obvious that in practice of the invention, it would be preferable to add to the ingredients of Expt. 2, various flavorings or nutriments such as meat broth, fat, minced meat or vegetables, for preparing sauces, gravies, or soups or to add sugar and other suitable flavorings for making dessert products.

Having thus described our invention, we claim:

1. A cooked food product of sauce-like to custard-like consistency comprising an edible liquid thickened with an amylaceous material at least 20% of which is waxy rice, said product being characterized in that it will exude substantially no watery liquid and will retain a smooth and creamy texture when frozen and thawed.

2. A cooked food product of sauce-like to custard-like consistency comprising an edible liquid thickened with waxy rice, said product being characterized in that it will exude substantially no watery liquid and will retain a smooth and creamy texture when frozen and thawed.

3. A cooked food product of sauce-like to custard-like consistency comprising an aqueous emulsion of fat thickened with waxy rice, said product being characterized in that it will exude substantially no watery liquid and will retain a smooth and creamy texture when frozen and thawed.

4. A frozen cooked food product which in the unfrozen state is of sauce-like to custard-like consistency comprising a frozen edible liquid thickened with waxy-rice, said product being characterized in that it will exude substantially no watery liquid and will retain a smooth and creamy texture when thawed.

5. A frozen cooked food product which in the unfrozen state is of sauce-like to custard-like consistency comprising a frozen aqueous emulsion of fat thickened with waxy rice, said product being characterized in that it will exude substantially no watery liquid and will retain a smooth and creamy texture when thawed.

6. A cooked food product of sauce-like to custard-like consistency comprising an edible liquid thickened with an amylaceous material at least 20% of which is waxy rice, said product being characterized in that it will exude substantially no watery liquid and will retain a smooth and creamy texture when frozen and thawed, said product also being characterized in that it will exude substantially no watery liquid and will retain a smooth and creamy texture when subjected to canning and storage in the canned state.

7. A canned, cooked food product of sauce-like to custard-like consistency comprising an edible liquid thickened with waxy rice, said product being characterized in that it will exude substally no watery liquid and will retain a smooth and creamy texture when subjected to storage in the canned state.

HELEN L. HANSON.
HANS LINEWEAVER.

References Cited in the file of this patent

"Waxy Cornstarch As a Replacement for Tapioca," by Schopmeyer et al. Industrial and Engineering Chemistry, November 1943, vol. 35, No. 11, pages 1168–1172.

"Amioca," The Food Packer, August 1944, pages 32, 33 and 72.

"Glutinous Corn and Sorghum Starches," by MacMasters et al. Industrial and Engineering Chemistry, vol. 36, No. 10, October 1944, pages 958–963.

"The Freezing Preservation of Foods," Tressler and Evers, Avi Publishing Co., New York, 1947, Second Edition, pages 658–660.